Patented Dec. 15, 1942

2,305,479

UNITED STATES PATENT OFFICE 2,305,479

PRODUCTION OF CANNED MEATS FOR STORAGE

Stephan L. Komarik, Chicago, Ill., assignor to The Griffith Laboratories, Inc., Chicago, Ill., a corporation of Illinois No Drawing. Application June 21, 1941, Serial No. 399,233

8 Claims. (Cl. 99—157)

The present invention relates generally to the canning of raw meats and products containing raw meat, and particularly to raw hams, picnics, luncheon meats, spiced hams, Mortadella, and like products.

While it is known that such products may be cooked in cans with a limited and negligible amount of purging of the fat and juices of the meat, this has required limitations of time and temperature of cooking to avoid purging, with the result that such cooked products require refrigeration to assure a safe and merchantable condition. Such a process is described in my prior Patent No. 2,224,399.

The present invention is a further development of the principles involved in said earlier patent, to overcome the necessity for refrigerating the canned product, while retaining the limited purging, and the improved flavoring by amino-acid development.

In said prior method the heating is conducted in such a way as to limit the extent and time of exposure of the surface layers to purging heat, while effecting a rapid and progressive increase of the temperature at the most remote part of the contents of the can, from a chill temperature of about 40° F. to a temperature in the range from 152° to 160° F. Such procedure is not sufficient to assure sterilization of the microorganisms which will produce spoilage, and particularly the thermophilic bacteria which become active at the higher normal temperatures where refrigeration is avoided. Such thermophilic bacteria require higher temperatures, as from 96° to 130° F. for their activity and growth.

The present invention has for an object the cooking of canned meat to avoid the necessity for refrigeration, while avoiding excess purging in the cooking process.

A particular object of the invention is to subject canned meat to a temperature which assures incubation of thermophilic, and hence other, bacteria, and then to cook the meat under conditions to assure killing the thermophilic and other bacteria, with avoidance of excess purging.

Still another object of the invention is to effect in process, a flavoring development of amino acids.

Various other and ancillary objects and advantages of the invention will appear from the following description and explanation of the invention.

It is not difficult to cook meat to effect a thorough and complete sterilization. For example, a canned 10-lb. ham requires that it be subjected to a temperature of 230° F. for 5¾ hours, to be sterile. But this will result in 40% purging of fat and juices, rendering the whole meat unattractive, less nutritious and loose-fibered, with practical waste. Such an article is unsalable, at present day standards. Therefore, unsterile products are in demand today, not because unsterile, but because of appearance and of the limited purging which can be effected.

The conditions above given are the result of the use of a large can, and the requirement that the most remote part of the meat, so treated, must attain 212° F. and be so held for at least 15 minutes. This is because the dormant life, which is thus not allowed a favorable incubation period, requires a higher temperature for killing, than active living bacteria.

By the present invention conditions are imposed which will assure that dormant life awaken and enter the active phase, whereby it can then be killed by lower temperatures, while the meat is cooking under conditions to limit purging. One essential of this treatment is to avoid too long an exposure for awakening the dormant life, so that spoilage in the can is not effected. While doing this, it has been found that the changes in the meat partake of the nature of ripening, with favorable development of amino-acid flavor. Thus, sterile canned meat with greatly improved flavor is a result. Also, the meat has the appearance of the unsterilized products, is firm and whole, and devoid of mushiness and of tendency to fall apart.

Generally the process begins with canned products. These are ordinarily vacuum-sealed, when containing raw meat at a chill temperature of about 40° F. Then the can is subjected to a heating which does not cook the meat, but which brings all the meat upward in temperature through a range wherein thermophilic bacteria will be activated. The top activating temperature is in a range from 125° to 130° F. To effect this, the surrounding temperature to which the can is exposed is not over 150° F., beginning preferably at 120° F., whereby the outer layers are first subjected to an activating range for thermophilic bacteria. The temperature of the surroundings may be gradually raised, or raised stepwise, to some limit not over 150° F.

In doing this, the outer layers will attain the exposure temperature while the more remote part is attaining the activating temperature. But the higher temperature of the outer layers will do no harm, because where it does not exceed 150° F. purging is minimized.

Practically, all this is effected by predetermined control. A liquid bath is used for holding the cans. The cans in the bath are preferably of the same size. By previous test with thermo-couples in like cans, it can be determined how long the can must immersed in one or more baths of controlled temperatures for controlled times, to effect at the remotest part of each can a temperature between 125° and 130° F.

Thereafter, the cans are removed and placed in a cooler, with air surroundings at a chill temperature of about 40° F. as for example 42° F. The longer the time or the smaller the can, the lower will the temperature of the remotest part fall. The exact time and temperature are not material, because as it cools, activity is arrested without the bacteria becoming dormant. However, since a subsequent cooking step is likewise effected by use of a predetermined control, it is preferred that the chill room be at a controlled temperature, and that each size of can be left in the chill room for a predetermined time, if the time is so short that the remote part is still cooling. An example hereinafter given will explain this more in detail. The chilling may continue until the whole contents attain the chill temperature. The chilling extends at least long enough to cool the remote part to not over 65° F. This is significant only to assure a time period to develop flavor.

Then the can is cooked, using a procedure which will not heat too highly the outer layers, thus to minimize purging, until the remote part has attained at least 160° F. This may be done more quickly by first exposing the can to a temperature not higher than 175° F., and cooling the exposure temperature to about 165° F. or even lower. until the remote part attains a temperature of 160° F. or higher, but not over 170° F., to limit purging.

Then the hot can may be chilled, as by immersion in running water, to arrest purging and to set the fats and juices in the contents, and quickly to lower the temperature to minimize effects of continued cooking while cooling. The chilled can may be kept in a chill room for a few days more firmly to set the fat and juices in the tissues of the meat.

The process may be carried out on beef, pork, ham, tongue, and various cuts of whole meat of any kind. It is preferred that bones be removed. Such removal is conducive to forcing the meat under high pressure into the can to fill it with the avoidance of voids. Voids collect purged matter, and also insulate in the cooking process. Ham and other pork products are favorites in the canned field, as whole meats, ground meats, spiced or not, and in compounded form, for luncheon and sandwich slices. The prior pickling or curing of such products with table salt, curing salt, sugar and the like, together with the large content of normal fat, render such products more subject to purging of watery juices and fat, than many other meats. Therefore, the process is particularly adaptable to such products, but not limited thereto.

The following formulas indicate meat compounds useful in the present invention.

FORMULA No. 1

Fresh pork trimmings are ground in part through a ⅛-inch plate, and in part through a ⅜-inch plate. Sodium chloride, spice, and curing salt are mixed with the ground meat in a vacuum mixer for 10 minutes, and then the mass is cooled to 34° F., for curing over night. Then the mass is mixed again in a vacuum mixer for 5 minutes, and stuffed into oblong No. 3 cans, and vacuum sealed at 27 inches, ready for processing.

FORMULA No. 2

Hams are cured with 10% brine of salimeter strength from 79° to 90°.

FORMULA No. 3.—LUNCHEON MEAT

| | | |
|---|---|---|
| Ground beef | Pounds | 60 |
| Ground pork | do | 40 |
| Sodium chloride | do | 3½ |
| Curing salt | ounces | 4 to 6 |
| Sugar and seasonings | | To taste |

FORMULA No. 4.—MORTADELLA

| | | |
|---|---|---|
| Coarse chopped beef or pork, alone or mixed | Pounds | 100 |
| Sodium chloride | do | 3¼ |
| Curing salt | Ounces | 4 to 6 |
| Sugar and seasonings | | To taste |

In carrying out the invention in practice, care is taken, as always, to select high grade clean raw meat, whether whole, or ground for compounded contents. Thus, in the case of whole hams, they are selected fresh from the cutting floor, usually at a temperature of 36° F. They are artery-pumped with pickle brine of 42° F. temperature, in a well known manner. Where a 79-degree salimeter pickle is used, 10% of such pickle is sufficient based on the weight of the ham. They are then dry-rubbed with curing salt and placed in a curing cellar at 36° F. for six days. Then they are lightly washed with luke warm water, boned, trimmed, and pressed into a can as boneless hams. Apparatus according to Komarik Patent No. 2,224,398, and Griffith Patent No. 2,224,908, may be used. The cans are then vacuum sealed at 27 inches of vacuum, when they are ready for processing. The cans are divided into groups according to exact or close can sizes, as provided for different weights of ham.

To illustrate the invention, and how the control of the process is determined, the following examples are given, covering test cans in which thermo-couples are inserted to read the temperature at the remotest part of the can. The following cases are given:

| | Pounds |
|---|---|
| No. 1, ham weight | 11 |
| No. 2, ham weight | 9¹⁰⁄₁₆ |

*Example 1*

The cans are placed in a cooking vat in water, the temperature of which is controlled as given in Table 1. The time is recorded. The inside temperature is recorded, and these data are coordinated as in Table 1. Slight differences in temperature result from the difference in sizes of the cans.

TABLE I

| Minutes | Water temp. | Internal temp. No. 1 ham | Internal temp. No. 2 ham |
|---|---|---|---|
|  | °F. | °F. | °F. |
| Start | 120 | 42 | 42 |
| 15 | 120 | 46 | 46 |
| 30 | 120 | 50 | 50 |
| 45 | 120 | 55 | 55 |
| 60 | 120 | 60 | 60 |
| 75 | 120 | 63 | 66 |
| 90 | 120 | 68 | 72 |
| 105 | 120 | 73 | 76 |
| 120 | 120 | 78 | 81 |
| 135 | 120 | 84 | 86 |
| 150 | 120 | 88 | 90 |
| 165 | 130 | 92 | 95 |
| 180 | 130 | 98 | 99 |
| 195 | 130 | 99 | 101 |
| 210 | 130 | 102 | 105 |
| 225 | 140 | 104 | 107 |
| 240 | 140 | 108 | 110 |
| 255 | 140 | 112 | 115 |
| 270 | 140 | 114 | 116 |
| 285 | 150 | 118 | 120 |
| 300 | 150 | 120 | 122 |
| 315 | 150 | 122 | 124 |
| 330 | 150 | 125 | 127 |
| 345 | 150 | 127 | ---------- |

The cans are then taken from the water bath and placed in a chill room of 40° to 42° F., or thereabouts. For the report here given it was at 42° F. After 16 hours the cooking period was started, at which time the internal temperatures were those shown at the start in Table 2.

TABLE II

| Minutes | Water temp. | Internal temp. No. 1 ham | Internal temp. No. 2 ham |
|---|---|---|---|
|  | °F. | °F. | °F. |
| Start | 175 | 61 | 60 |
| 15 | 175 | 57 | 56 |
| 30 | 175 | 56 | 56 |
| 45 | 175 | 64 | 64 |
| 60 | 175 | 70 | 72 |
| 75 | 175 | 78 | 80 |
| 90 | 175 | 87 | 87 |
| 105 | 175 | 95 | 95 |
| 120 | 175 | 102 | 102 |
| 135 | 175 | 108 | 108 |
| 150 | 175 | 115 | 115 |
| 165 | 175 | 122 | 122 |
| 180 | 167 | 130 | 130 |
| 195 | 167 | 132 | 132 |
| 210 | 167 | 140 | 140 |
| 225 | 167 | 143 | 143 |
| 240 | 167 | 146 | 146 |
| 255 | 167 | 148 | 148 |
| 270 | 167 | 150 | 150 |
| 285 | 167 | 152 | 152 |
| 300 | 167 | 154 | 154 |
| 315 | 167 | 156 | 156 |
| 330 | 167 | 158 | 158 |
| 345 | 167 | 159 | 159 |
| 360 | 167 | 160 | 160 |

Immediately, the cans are placed in cold running water of 42° F. for 2 hours, then kept in a cooler at 36° F. for two days to set juices in the tissue. The cans may be normally cooled from the cooking, to room temperature, without such chilling, but the appearance and character of the product is much improved by the chilling.

The cooked cans may then be kept without refrigeration, with no spoilage. This is evidenced by gas pressure blowing up the cans in due time.

*Example 2*

Spiced luncheon meat according to Formula No. 1 given above, in No. 3 oblong cans equipped with thermo-couples, are processed by the same procedure as in Example 1, with the following comparable results:

TABLE III

| Minutes | Water temp. | Internal temp. |
|---|---|---|
|  | °F. | °F. |
| 15 | 120 | 53 |
| 30 | 120 | 62 |
| 45 | 120 | 72 |
| 60 | 120 | 82 |
| 75 | 120 | 89 |
| 90 | 120 | 96 |
| 105 | 120 | 102 |
| 120 | 130 | 107 |
| 135 | 130 | 112 |
| 150 | 130 | 115 |
| 165 | 130 | 121 |
| 180 | 140 | 122 |
| 195 | 140 | 125 |
| 210 | 140 | 129 |

The cooling practice of Example 1 is followed, then the cooking is started.

TABLE IV

| Minutes | Water temp. | Internal temp. |
|---|---|---|
|  | °F. | °F. |
| 15 | 167 | 48 |
| 30 | 167 | 68 |
| 45 | 167 | 88 |
| 60 | 167 | 107 |
| 75 | 167 | 121 |
| 90 | 167 | 132 |
| 105 | 167 | 140 |
| 120 | 167 | 148 |
| 135 | 167 | 152 |
| 150 | 167 | 156 |
| 165 | 167 | 160 |
| 180 | 167 | 160 |

The chilling in water, then in a cooler, is practiced as in Example 1.

THE PRODUCT

In Examples 1 and 2, the product on opening is little purged, solid, and of excellent appearance to slice or serve directly. It has a superior taste and ripened flavor resulting from amino acid development. The products have been kept at ordinary room temperature of 75° to 80° F. in winter and 90° F. in summer, for a period of 5 months, and on opening are unchanged in taste, quality and appearance.

The invention is of great value in providing for economic storage and transportation of food. In times of plenty, reserves may be accumulated with avoidance of refrigeration expense. It is obviously of great value for homes, campers, armies, and for export business.

Herein, where the terms "raw ham" or "raw meat" are used, this includes cured meat, whether cured by brine or smoke, or both.

The invention is subject to modification in many ways as to control, without departing from the spirit and scope of the invention as set forth in the appended claims.

I claim:

1. The method of cooking a sealed can containing raw meat, which comprises heating the can from a chill temperature of about 40° F. by exposure to an increasing temperature in the range from 120° to 150° F. until the remote and coldest part of the contents of the can attains a temperature in the range from 125° to 130° F., whereby organic life within the can will have been exposed to favorable conditions for incubation to bring such life out of any dormant state without necessarily exterminating all organic life in the can, subjecting the can to a chill temperature of about 40° F. until the warmest part of the contents of the can cools to a temperature not over 65° F. whereby to favor the development of amino acid flavor, and then heating the can by exposure to a decreasing temperature in the range from 175° to 165° F. until the coolest part of the can attains a temperature of at least 160° F. and not over 170° F.

2. The method of cooking a sealed can containing raw meat, which comprises heating the can from a chill temperature of about 40° F. by exposure to an increasing temperature in the range from 120° to 150° F. until the remote and coldest part of the contents of the can attains a temperature in the range from 125° to 130° F., whereby organic life within the can will have been exposed to favorable conditions for incubation to bring such life out of any dormant state without necessarily exterminating all organic life in the can, subjecting the can to a chill temperature of about 40° F. until the warmest part of the contents of the can cools to a temperature not over 65° F. whereby to favor the development of amino acid flavor, and then heating the can by exposure to a decreasing temperature in the range from 175° to 165° F. until the coolest part of the can attains a temperature of at least 160° F. and not over 170° F., and chilling the entire contents of the can to set the juices in the tissues of the cooked meat.

3. The method of cooking a sealed can containing raw meat, which comprises heating the can by exposure to a temperature not in excess of 150° F. until the remote and coldest part of the contents of the can attains a temperature in the range from 125° to 130° F., chilling the can by exposure to a temperature of about 40° F. until the remotest part has cooled to not over about 65° F., and then heating the can by exposure to a temperature not over 175° F. until the remotest part of the can attains a temperature of at least 160° F. and not over 170° F.

4. The method of cooking a sealed can containing raw meat, which comprises heating the can by exposure to a temperature not in excess of 150° F. until the remote and coldest part of the contents of the can attains a temperature in the range from 125° to 130° F., chilling the can by exposure to a temperature of about 40° F. until the remotest part has cooled to not over about 65° F., and then heating the can by exposure to a temperature not over 175° F. until the remotest part of the can attains a temperature of at least 160° F. and not over 170° F., and chilling the entire contents of the can to set the juices in the tissue of the cooked meat.

5. The process of claim 1 in which the contents of the can is whole meat.

6. The process of claim 2 in which the contents of the can is whole meat.

7. The process of claim 3 in which the contents of the can is whole meat.

8. The process of claim 4 in which the contents of the can is whole meat.

STEPHAN L. KOMARIK.